(12) United States Patent
Lepola

(10) Patent No.: US 7,514,653 B2
(45) Date of Patent: Apr. 7, 2009

(54) SMALL DIAMETER PIPE REPAIR DEVICE

(75) Inventor: William Lepola, Magnolia, TX (US)

(73) Assignee: Energy Maintenance Services Group I LLC, Houston, TX (US)

( * ) Notice: Subject to any disclaimer, the term of this patent is extended or adjusted under 35 U.S.C. 154(b) by 0 days.

(21) Appl. No.: 11/408,719

(22) Filed: Apr. 21, 2006

(65) Prior Publication Data

US 2007/0272679 A1    Nov. 29, 2007

Related U.S. Application Data

(60) Provisional application No. 60/782,818, filed on Mar. 16, 2006.

(51) Int. Cl.
*H05B 1/02* (2006.01)

(52) U.S. Cl. .................... 219/494; 219/528; 219/435; 156/94; 156/156; 156/294; 425/11; 425/389; 425/392; 264/36.17

(58) Field of Classification Search ............. 219/494, 219/528, 243, 535, 497; 156/94, 156, 287, 156/294, 423; 264/36.17, 36.22, 269, 404; 425/11, 389, 392, 393

See application file for complete search history.

(56) References Cited

U.S. PATENT DOCUMENTS 3,962,394 A * 6/1976 Hall ........................... 264/573
4,972,880 A * 11/1990 Strand ......................... 138/98
5,242,517 A * 9/1993 Endoh ........................ 156/92
5,259,901 A * 11/1993 Davis et al. ................. 156/154
5,628,345 A * 5/1997 Fisco .......................... 138/98
5,706,861 A * 1/1998 Wood et al. .................. 138/98
6,093,363 A * 7/2000 Polivka ...................... 264/516
7,052,567 B1 * 5/2006 Blackmore et al. ........... 156/94

* cited by examiner

*Primary Examiner*—Mark H Paschall
(74) *Attorney, Agent, or Firm*—Law Office of David McEwing

(57) ABSTRACT

A tube shaped and fluid inflatable and electrically heatable in-situ pipe repair device comprising a first outer elastomeric tube layer and a resistive heating component comprised of electrically conductive fibers braided over an elastomeric core. The tube shaped device also contains an inner annulus. The device is fluid sealable and is connectible to a fluid supply and vacuum source. It is also connectible to an electrical power source.

The device may also comprise two tube shaped layers configured to fit snuggly together with a resistive heating component held between the two layers. The resistive heating component may be a braided fiber-elastomeric core combination or a conductive fiber configured in a sinusoidal wave or similar pattern.

7 Claims, 4 Drawing Sheets

SMALL DIAMETER PIPE REPAIR DEVICE

RELATED APPLICATION

The application claims benefit of and priority to application No. 60/782,818 entitled "Small Diameter Pipe Repair Device" filed Mar. 16, 2006. This application is incorporated by reference.

FIELD OF USE

The present invention pertains to a method and device for transporting a repair material to a location within a pipe or conduit. The device carrying the repair material may be inflated with a fluid, thereby pressing the repair material to the inner surface of the host pipe. The device may also be energized with electric current to resistively heat the repair material.

BACKGROUND OF INVENTION

The invention pertains to in situ repair or lining of fluid conveying pipes or conduits such as water or sewer pipes. It may also used for repair and lining of industrial process piping systems.

SUMMARY OF INVENTION

The device subject of this disclosure comprises a tube shaped and fluid inflatable and electrically heatable in-situ pipe repair device comprising a first outer elastomeric tube layer and a resistive heating component comprised of electrically conductive fibers braided over an elastomeric core. The tube shaped device also contains an inner annulus. The device is fluid sealable and is connectible to a fluid supply and vacuum source. It is also connectible to an electrical power source.

The device may also comprise two tube shaped layers configured to fit snuggly together with a resistive heating component held between the two layers. The resistive heating component may be a braided fiber-elastomeric core combination or a conductive fiber configured in a sinusoidal wave or similar pattern.

The accompanying drawings, which are incorporated by reference and constitute part of the specification, illustrate preferred embodiments of the invention. These drawings, together with the general description of the invention given above and the detailed description of the preferred embodiments given below serve to explain the principles of the invention.

DETAIL DESCRIPTION OF INVENTION

This disclosure pertains to a novel device for in-situ repair or lining of pipes or conduits. The device is inflatable and elastomeric. It is flexible and can bend on a radius. It can be heated using electrically conductive wires or fibers (electrical heating components).

The device is tube shaped and dimensioned to fit within the inside diameter of a pipe. When inflated, the device presses against the inner pipe wall. The device may be used to place a repair material at a repair location within the pipe. The repair material ("liner") may be placed on the outer surface of the device. As will be explained below, the device may be inflated and expanded with fluid pressure. The device expands radially, pressing the liner against the inside pipe wall surface. Using electrical heating components within the device, the liner may be heated and thermally responsive resin such as heat curable resin within the repair material may be molded to the inside pipe wall surface.

The tube shaped device has a first end and a second end. In one embodiment, each end is fluid sealed. One end has a fluid conveying port which may be connected to a fluid source and a vacuum source to convey fluid to and from an annulus within the tube. In another embodiment, one end of the tube is sealed and the other end is connected to a housing. Using fluid pressure, the device can be everted out of the housing into a pipe.

The device can be heated using electrically conductive wires or fibers (hereinafter "resistive heating components"). The wires or fibers (hereinafter fibers) may be braided over an elastomeric core. The core may have a round cross sectional profile or be square or rectangular. Other shapes are possible. A square or rectangular cross sectional shape has a reduced profile than a circle.

Figure 8:
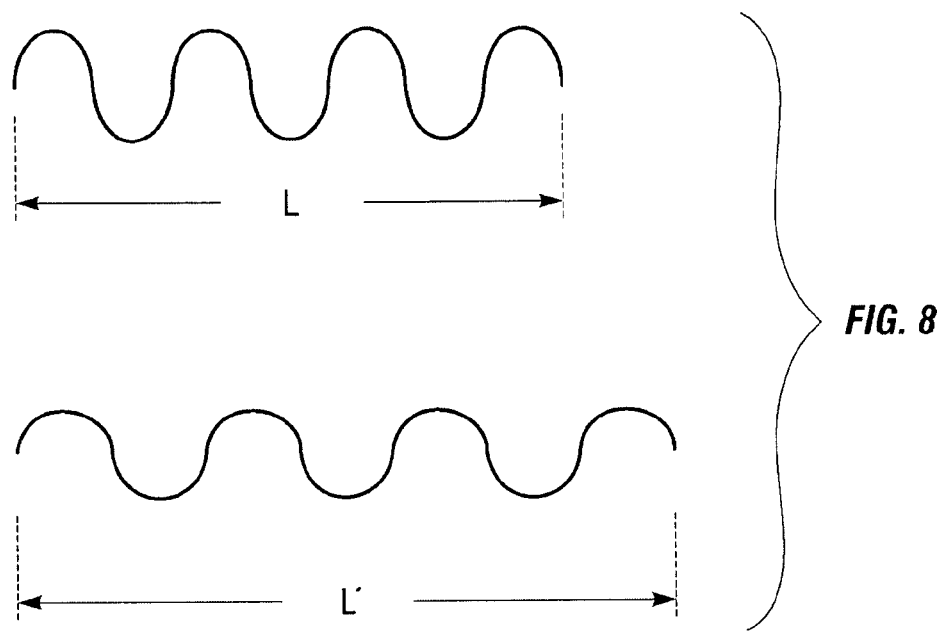
FIG. 8 illustrates a resistive heating component configured in a sinusoidal wave pattern. Illustrated is the longitudinal expansion or lengthening of such a component.

The braided fiber/elastomeric core combination ("braid component") can be placed within lumens extending along the longitudinal axis of the tube. The resistive heating component (braided over the elastomeric core) or an alternate electrical heating component (such as shown in FIG. 8) may alternately be placed between two separate tube layers. (A tube fitting snuggly within an outer tube.) The heating component may alternately be placed within the inner tube which may be a foam material. The heating component is not bonded to the tube.

The device is dimensioned to fit within a pipe. For example, for a pipe having an internal diameter of 2 inches, the uninflated device may have an outer diameter of 1 and 5/8 inches. When inflated, the outer diameter of the device will be at least 2 inches.

One embodiment of the invention comprises a first outer tube, a second inner tube containing resistive heating components and end plugs. Another embodiment of the invention comprises an outer tube containing a plurality of longitudinally oriented inner lumens containing resistive heating components.

In another embodiment, the resistive heating component is placed between the first and second tubes. The second tube is dimensioned to snuggly fit within the inner diameter of the first tube. The heating component is thereby held in place without being bonded to or embedded within either tube.

The device is connected to controls and an external electrical power source and fluid source. The device may comprise an electrical cable in communication with the resistive heating components and power source. The invention can also includes a fluid hose connected to an internal annulus (inflation cavity) and fluid source. An example of a fluid source is an air compressor. The device can also be used with a vacuum pump.

In one embodiment, the device is comprised of a first outer layer that is in a tube or cylindrical shape. The outer layer has a first end and a second end. In one embodiment, the outer layer is comprised of silicone. It is elastomeric. It can expand in diameter under fluid pressure. The first layer can be made of extruded silicone or calendared sheet formed into a tube shape. The thickness of this outer layer can be approximately ⅛ inch. In one embodiment, the outer layer may have an un-inflated diameter of approximately 2 to 2½ inches. The outer tube may be temperature tolerant to temperatures in excess of 140° F.

There is a second inner tube or cylindrical shaped layer (thereby forming an inner annulus as will be discussed below). The second inner layer is dimensioned to fit snugly or closely to the inner diameter of the first outer tube layer. In one embodiment, the inner layer is formed of a closed cell silicone foam with an integral surface skin. The foam is compressible and elastomeric. It can expand in diameter under fluid pressure. The foam may have a wall thickness of approximately ½ inch. The second foam tube layer may also be temperature tolerant.

Resistive heating components extend longitudinally along the length of the inner foam tube layer. In a preferred embodiment, the resistive heating component comprises carbon fibers. The fibers are on the outer surface of the inner layer and proximate to the inside surface of the outer layer. In another embodiment, the longitudinally oriented fibers are contained in slits cut within the outer surface of the inner foam layer. In another embodiment, the inner layer may be formed containing grooves in the outer surface in which the resistive heating components can be placed. The resistive heating components extend the length of the inner layer and extend to connections within end plugs as will be further discussed.

Advantages of this construction include the electric conductive fibers held in position by friction in contrast to being embedded or bonded to the second inner layer. This provides for movement or "stretching" of the fibers as will be discussed below. This construction also permits replacement of fibers separate from the "holding" foam layer. Also, the first outer tube layer and the second inner tube layer are not bonded together, thereby also permitting separate replacement.

In a preferred embodiment, the electrically conductive fibers are comprised of carbon fibers. In one embodiment, the fibers comprise four 3K filament carbon fibers that are over-braided on an elastomeric silicone cord to form a conductive fiber bundle. In one embodiment, this silicone cord is approximately ⅛ inch in diameter. The braiding may be conducted when the cord is stretched under tension. When the cord is relaxed, the carbon fibers braid is compressed (increased braid angle). The fiber braid/elastic core combination (braid component) is installed in the device in a relaxed state. This is advantageous. When the device traverses a pipe bend, one side of the cylinder shaped device is "stretched" over an outer radius. This construction of the carbon fiber braided bundle permits the braid angle to decrease and "stretch" around this radius.

Although the length of the elastomeric device may be fixed (such as by the internal tether discussed further herein) the radial expansion of the tube requires the longitudinally oriented heating component to lengthen ("stretch"). This movement is permitted by the "excess" fiber braided over the elastomeric core. It will be appreciated that the fibers (or wires) are not elastic. The excess fiber material is created when braiding with the elastomeric core in an extended position.

In one embodiment, 8 separate electrically conductive braided fiber bundles extend longitudinally the length of the device. Each bundle comprises 4 3K braided carbon fibers. The 8 fibers bundles are placed about the circumference of the second inner foam layer. Each forms an electrical resistive heating component that when attached to an electrical power source, form a circuit. The components may be connected in parallel to a power source. It will be appreciated that more than 8 resistive heating components may be used. Additional components will be advantageous for embodiments used to repair larger diameter pipes.

The combination first outer and second inner tube layers create an annulus having a longitudinal axis of orientation. When combined with fluid sealable end pieces ("end plugs") this annulus forms an inflation chamber. When a positive pressure is created by the addition of fluid (through a fluid port at one end plug) into the annulus, the first and second layers expand in a radial direction.

Figure 1:
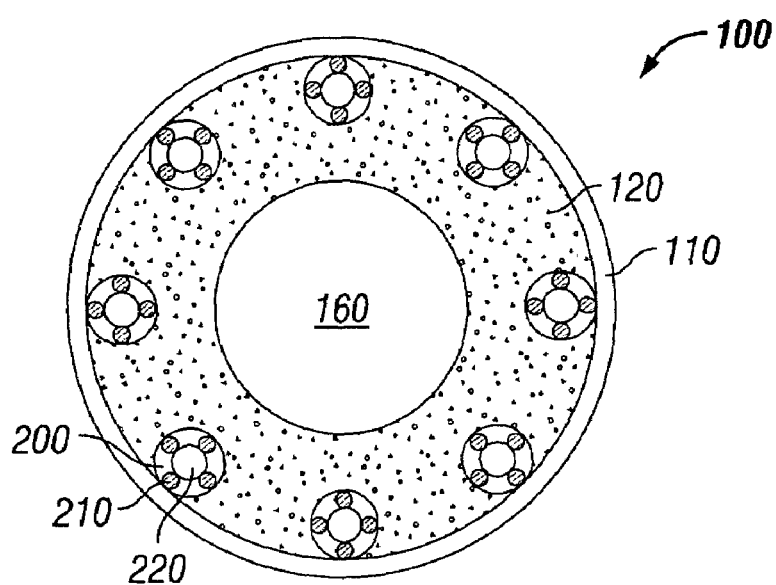
FIG. 1 illustrates an end view of one embodiment of the device comprising a first outer tube layer and a second inner closed cell foam layer (tube shaped) around an inner annulus. The second inner foam layer also contains resistive heating components proximate to the outer surface of the second layer.

FIG. 1 illustrates an end view of the device 100 comprising the first outer layer 110 and the second inner layer 120 comprised of closed cell foam. Within the second foam layer are spaces 200 that contain the resistive heating components. These spaces may be merely slits in the outer surface of the second layer. In another embodiment, the spaces may be grooves within the outer diameter which may be formed in extruding the foam tube. In the embodiment illustrated, the resistive heating component 210 comprises four carbon fiber bundles braided over an elastomeric and flexible silicone cord 220.

Also illustrated is the inner annulus 160. The diameter of this annulus may be expanded by inflating fluid pressure. It will be appreciated that, when inflated, the diameter of the outer surface of the first layer also expands. Repair material (not shown) is carried on the outer surface of the first layer 110. Inflation of the device presses the repair material to the inner pipe wall surface (not shown).

Figure 2:
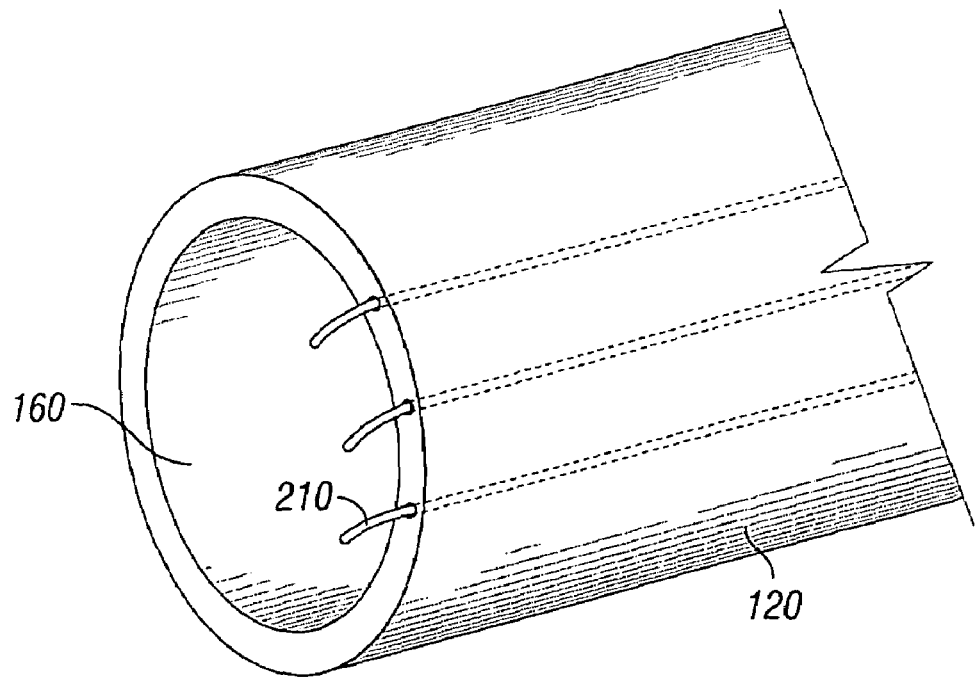
FIG. 2 illustrates a side perspective of the second inner layer showing the longitudinal orientation of the resistive heating components.

FIG. 2 is a perspective view illustrating the fiber comprising the resistive heating component 210 extending from the end of the second inner foam layer 120. The resistive heating components extend the length of the device, parallel to the longitudinal axis of the tube shape. The heating components may be held in slits (not shown) cut in the outer surface of the foam layer. The outer tube layer is not illustrated.

The end plugs will now be discussed. In one embodiment, the end plugs are made of copper (or other electrically conductive material). The plug fits within the inner diameter of the second layer. The electrically conductive fibers, extending longitudinally along the second layer, are clamped or otherwise attached to the electrically conductive end cap. The end plug forms a fluid sealed connection with the inner foam tube layer. In another embodiment, it may also form a sealed connection with the outer tube layer.

In another embodiment, the end plug may be made of a non conductive material such as a resin plastic. The plug may contain electrically conductive components connected to the conductive fiber bundles that comprise the resistive heating component.

In another embodiment, the end plugs may have a port (connector) in which electrical components may be attached in communication with the conductive fiber bundles (resistive heating components) and to an electrical power source.

One end cap contains a port through which fluid may be conveyed in and out of the inner annulus (inflation chamber). This port can be placed in communication with a fluid source, such as an air compressor.

One end plug may also contain a port through which an electrical connector, e.g., electrical wire, can be extended. For example, a first plug may be closed and forms the fluid sealed connection with the inner layer. The first plug also contains the electrical contact for the plurality of carbon fibers extending from the first end of the foam layer. A wire may be attached to the end plug and extended through the length of the annulus to the second end (where the second end plug is to be installed).

Figure 7:
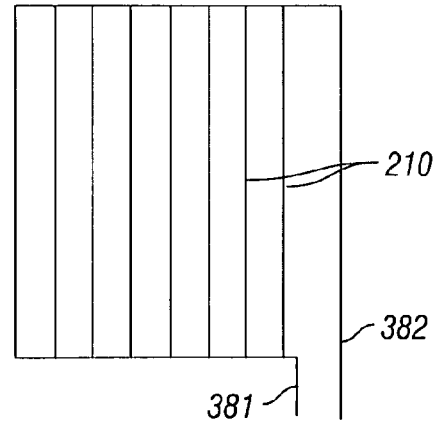

The second end plug may contain the fluid conveying port. It also contains a port through which this wire (extending from the first plug) may cross. A suitable electrical connective component may be used as will be appreciated by persons skilled in the art. The point is that this sub-component, the electrical wire extending from the first end through the second end, forms one side of an electrical circuit and can be placed in communication with an electrical power source. Reference is made to FIG. 7 and wire 382. A second wire may be attached to the second end plug. This second end plug serves as the electrical contact point at the second end for the fibers (again traversing longitudinally proximate to the outer surface of the second inner foam layer and extending from the second end of the foam layer) at the second end. This second wire 381 may be attached to an electrically conductive component and which in turn may be joined with the first wire 382 at a suitable electrical power cable. The electrical power cable will extend through the pipe being repaired to an electrical power source. This electrical power cable may be bundled with the fluid conveying hose, e.g., an air hose, forming an umbilical.

In one embodiment, the end plugs (sealing caps) are rigid parts such as commercially available plumbing fittings. One end plug may contain a minor diameter (port) threaded to accept a fluid (air) fitting. The carbon fiber bundles are assembled into one mechanical style fitting (crimp type) and attached to a circuit leg wire. This wire is then fed through the air line to a break-out fitting within the fluid conveying components. An adhesive is applied to the end plug and the foam layer is cinched down over the plug.

The end plug at the opposite end may be similarly attached to the foam layer but the end plug is closed. The carbon fiber bundles are again assembled together and connected to another circuit leg wire. This wire feeds through the annulus and exits the first described end plug along with the other circuit leg (again described in the preceding paragraph).

At each end, the silicone outer tube layer may be rolled back and adhered to itself to provide protection. An additional layer of self fusing tape can be applied.

In another embodiment, a protective end cap is placed over each end of the tube shaped device, covering each end plug. The end cap may be made of silicone. It may be flexible. The end cap at the second end may contain an aperture for the electrical cable and fluid hose. In one embodiment, the protective end cap forms a fluid seal with the first outer layer.

In one embodiment, the end components, i.e., the end plugs, wire connection and hose connection may be potted with silicone.

In one embodiment, each end may be fitted with components or hardware that allows the device to be pulled through a pipe to the repair location. For example, an "eye" attachment may be fitted through the protective end cap and the end plug. There may be a corresponding "eye" that extends into the annulus. A tether may be attached to this internal eye (within the annulus). The tether may extend to the second end of the device and be similarly attached to a second eye within the annulus. The tether has a fixed length. This tether may restrain expansion of the tube in the longitudinal direction. This configuration will also facilitate the force of pulling the device through a pipe to be distributed to both ends.

Figure 3:
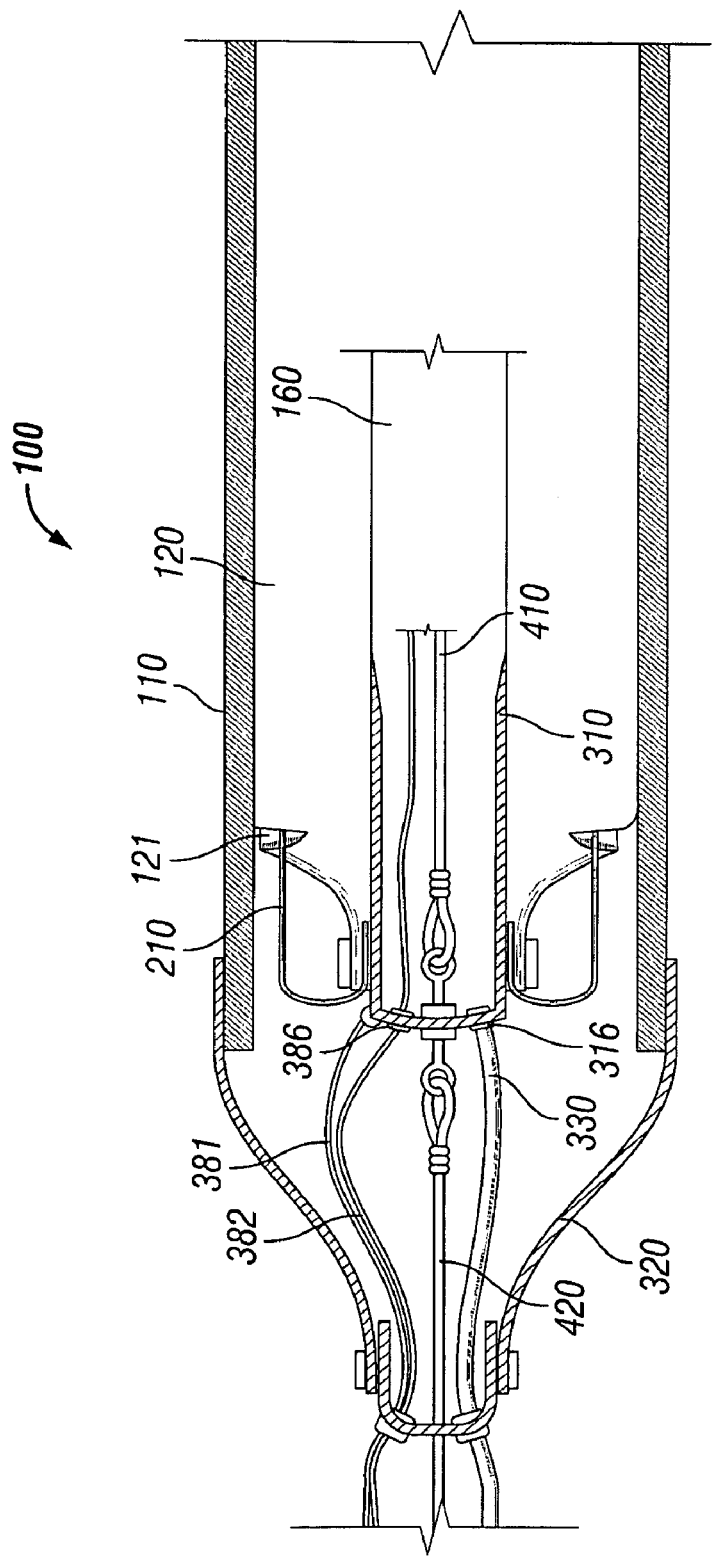
FIG. 3 illustrates a side view of one end of the device showing the end plug, end cap, first tube layer, the second closed cell foam layer, the annulus and the resistive heating components. Also illustrated are the fluid hose and the electrical wires that may form an electrical power cable. The internal tether and pulling cables with connective hardware are also illustrated.

FIG. 3 illustrates a side view of the second end of the device described above. The end comprises a protective end cap 320 and end plug 310. The end plug attaches to the inner foam layer 120. The end plug contains a port 386 for an electrical wire 382 extending from the opposite end (first end) of the device and connected to the other end of the resistive heating circuit (comprised of the carbon fiber 210). Reference is made to the return wire 382 depicted in the schematic representation of FIG. 7.

The end plug also comprises a fluid port 316 placing the inner annulus 160 in communication with a fluid hose 330. The end plug also is connected to a second wire 381 and to the carbon fiber 210 extending from a slit 121 within the foam layer. The wires 381 and 382 may be joined in an electrical cable. The cable and fluid hose may be joined to form an umbilical to the device from a fluid and power source. Also illustrated in FIG. 3 is an embodiment incorporating an internal tether 410 extending from an eye bolt within the end plug to a similar structure (not shown) in the opposite end. The eye bolt is also attached to a pulling cable 420. A pulling cable configuration may also be installed at the first end.

To facilitate the insertion and maneuvering of the device through the pipe (and carrying the liner on the outer surface) the device may be deflated and placed under negative fluid pressure. This will cause the device to collapse onto itself achieving a minimum diameter. The device may be maneuvered through the pipe using pulling cables.

In one embodiment described above, the inner layer is a fluid impermeable foam. It is advantageous to place the outer layer in a negative internal pressure. Therefore one or more one way fluid passages may be placed through the inner foam layer radially from the annulus. These holes can be controlled by a check valve. The will enable the first outer layer to experience a negative fluid pressure. However, the "one way" functionality of the check valve will prohibit fluid to enter through the hole in the in the second inner foam layer and possibly bubble between the first and second layer.

In another embodiment of the invention, the device may comprise a single walled tube. The tube may be comprised of silicone or other elastomeric, flexible and temperature tolerant material. The wall of the tube may contain a plurality of lumens extending the length of the tube. Stated differently the tube is a cylindrical shape having a first end and a second end. The tube shape has a longitudinal axis of orientation. Lumens extend within the wall parallel to the axis.

Figure 4:
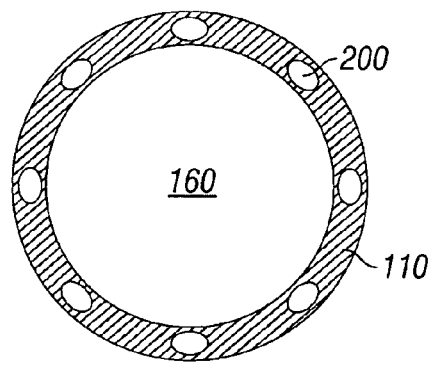
FIG. 4 illustrates an end view of an embodiment comprising a single wall tube with integral lumens for holding the resistive heating components.

FIG. 4 illustrates a view of a first end of the tube 100 comprising a single wall 110 containing 8 lumens 200. It will be appreciated that the lumens extend to the second end of the tube. The lumens can contain electrically conductive components, e.g., wires or fibers, comprising the resistive heating circuits (not shown).

The interior of the tube forms a cavity or inflation annulus 160. When placed under positive fluid pressure, the diameter of the tube expands. It will be readily appreciated by persons skilled in the art the expanding diameter can press repair material to the inner pipe wall surface.

Figure 5:
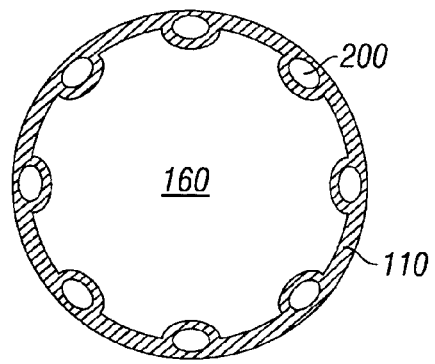
FIG. 5 illustrates another embodiment of a single wall tube with lumens.

FIG. 5 illustrates a cross sectional view of another single wall inflation tube device 100. In yet another embodiment (not illustrated) the lumens may be bonded to an inner wall of a flexible tube. The tube may be a seemless extruded tube shape. The thin wall construction will facilitate inversion and eversion of the device.

It will also be appreciated that the single wall repair device may be more flexible and compressible than the combination outer tube and inner foam tube. This may facilitate the device and repair material maneuvering through pipes, including non-linear pipe. The heating components comprised of electrically conductive fibers braided over an elastomeric core facilitate the use of a flexible and elastomeric inflatable tube.

In another embodiment, the electrically conductive and resistive heating components may be connected at one end of the tube. (See the schematic of the resistive heating circuit illustrated in FIG. 6.) This construction will eliminate the need for an electrical conductor returning from a first end to the second end through the annulus with a corresponding connection or port through the second end plug as illustrated in FIG. 3 and the port 386 and the wire 382 returning from opposite end of the device.

Figure 6:
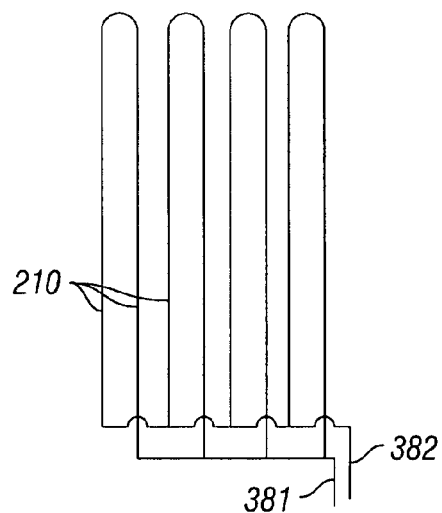
FIGS. 6 and 7 illustrate alternate circuit paths of the resistive heating components of the device.

FIG. 6 illustrates an electrical circuit described in the foregoing paragraph wherein 8 electrically conductive resistive heating components form 4 parallel circuits. The component connecting each pair of resistive heating components may be contained in the end plug (not shown). FIG. 7 illustrates 8 electrically conductive resistive heating components forming 8 parallel circuits. The return wire 382 is also illustrated. It will be appreciated that FIGS. 6 and 7 illustrate the heating circuits in a flat plane wherein they are oriented axially around the circumference of the tube as illustrated in FIG. 1.

In another embodiment, the fiber may be configured in a sinusoidal wave pattern as illustrated in FIG. 8. The length of the in-elastic resistive heating component may be extended from L to L' as illustrated. This configuration may be advantageously implemented for a resistive heating component held between two tube layers.

Figure 9:
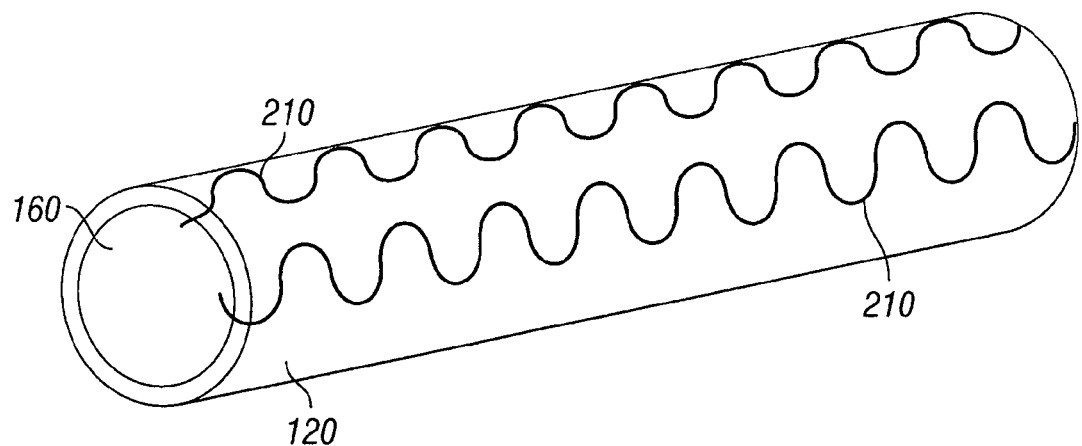
FIG. 9 illustrates two sinusoidal shaped resistive heating components placed on the outer surface of a second inner tube layer.

FIG. 9 illustrates the positioning of the sinusoidal shaped heating components 210 placed on the outer surface of the second inner tube 120. The inner annulus 160 is also illustrated. The first outer tube (not shown) is placed over the second tube and the heating component is held between the two separate layers. It will be appreciated that this configuration permits the resistive heating component to move or lengthen ("stretch") in response to radial expansion of the device or maneuvering of the device through a bend in a pipe.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention maybe utilized independently of the use of other features, all as would be apparent to one skilled in the art after having the benefit of this description of the invention.

While specific embodiments have been illustrated and described, numerous modifications are possible without departing from the spirit of the invention, and the scope of protection is only limited by the scope of the accompanying claims.

What we claim is:

1. A tube shaped and fluid inflatable and electrically heatable in situ pipe repair device comprising:
    a) a first outer elastomeric layer;
    b) an resistive heating component;
    c) a second elastomeric foam layer;
    d) an annulus;
    e) a first end component containing electrical contacts for the resistive heating component wherein the end component forms a fluid seal with a first end of at least one layer; and
    f) a second end component comprising electrical contacts for the resistive heating component to a power source and further comprising a port for conveying fluid into the annulus wherein the second end component forms a fluid seal with a second end of at least one layer.

2. The device of claim one wherein the first elastomeric layer is silicone.

3. The device of claim one wherein the second elastomeric layer is a closed cell foam.

4. The device of claim 3 wherein the closed cell foam is comprised of silicone.

5. The device of claim 1 wherein the resistive heating component comprises fibers.

6. A tube shaped and fluid inflatable and electrically heatable in situ pipe repair device comprising:
    a) a first outer elastomeric tube a longitudinal axis of orientation and having a fluid sealed first end and a fluid sealable second end wherein the second end comprises a port connectible to a fluid source and a component connectible to a power source;
    b) a second inner elastomeric tube comprising foam;
    c) a plurality of heating components positioned parallel to the axis of orientation and between the first tube and the second tube wherein the heating components a sinusoidal shape; and
    d) electrical contacts for the resistive heating components to a power source and further comprising a port for conveying fluid into an annulus within the second elastomeric tube wherein the first and second end tube component forms a fluid seal.

7. The repair device of claim 6 wherein at least one heating component can be energized separately from the other heating units.

* * * * *